April 7, 1970     B. J. YELIN ET AL     3,504,638
FREIGHT VEHICLE
Filed June 22, 1966     4 Sheets-Sheet 1
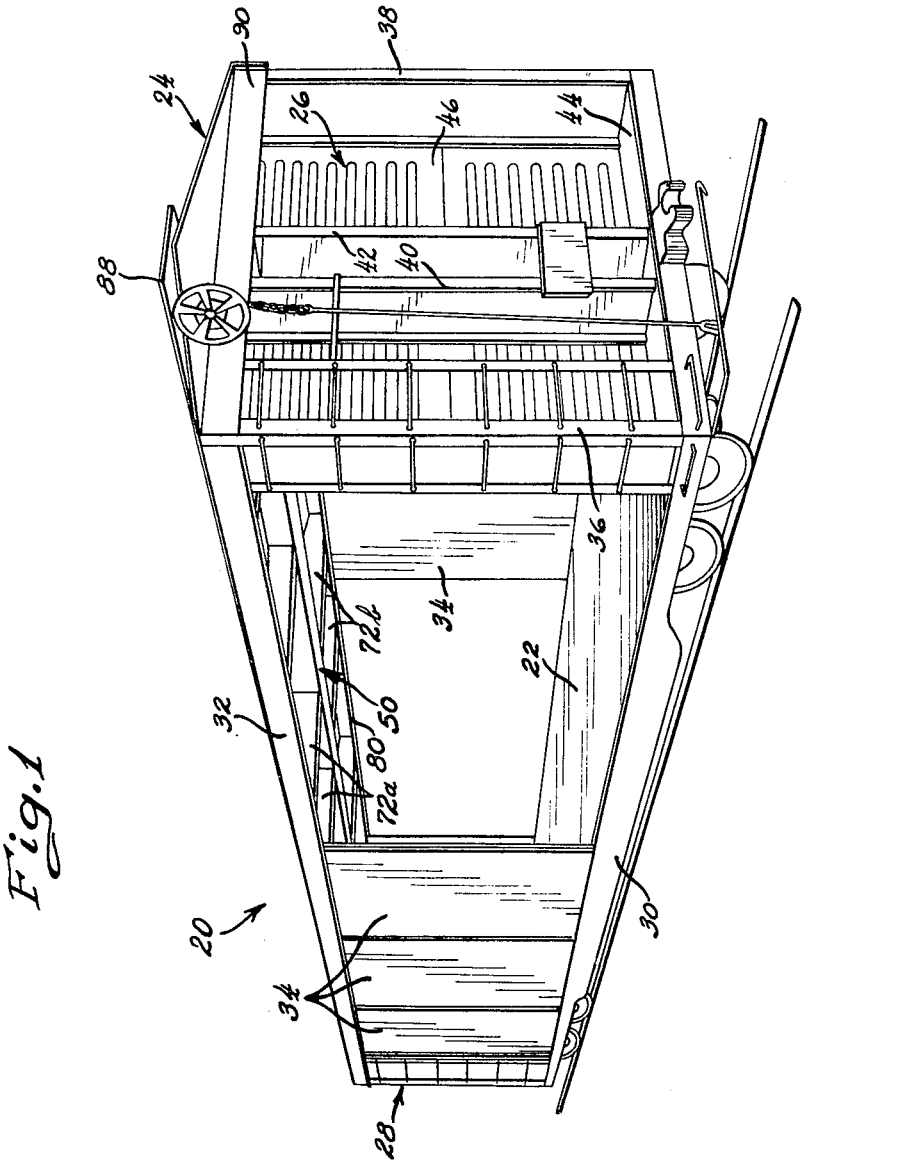
Inventors
BERNARD J. YELIN
NORMAN V. BAHLER
By
Gary, Parker, Juettner & Cullinan
Att'ys

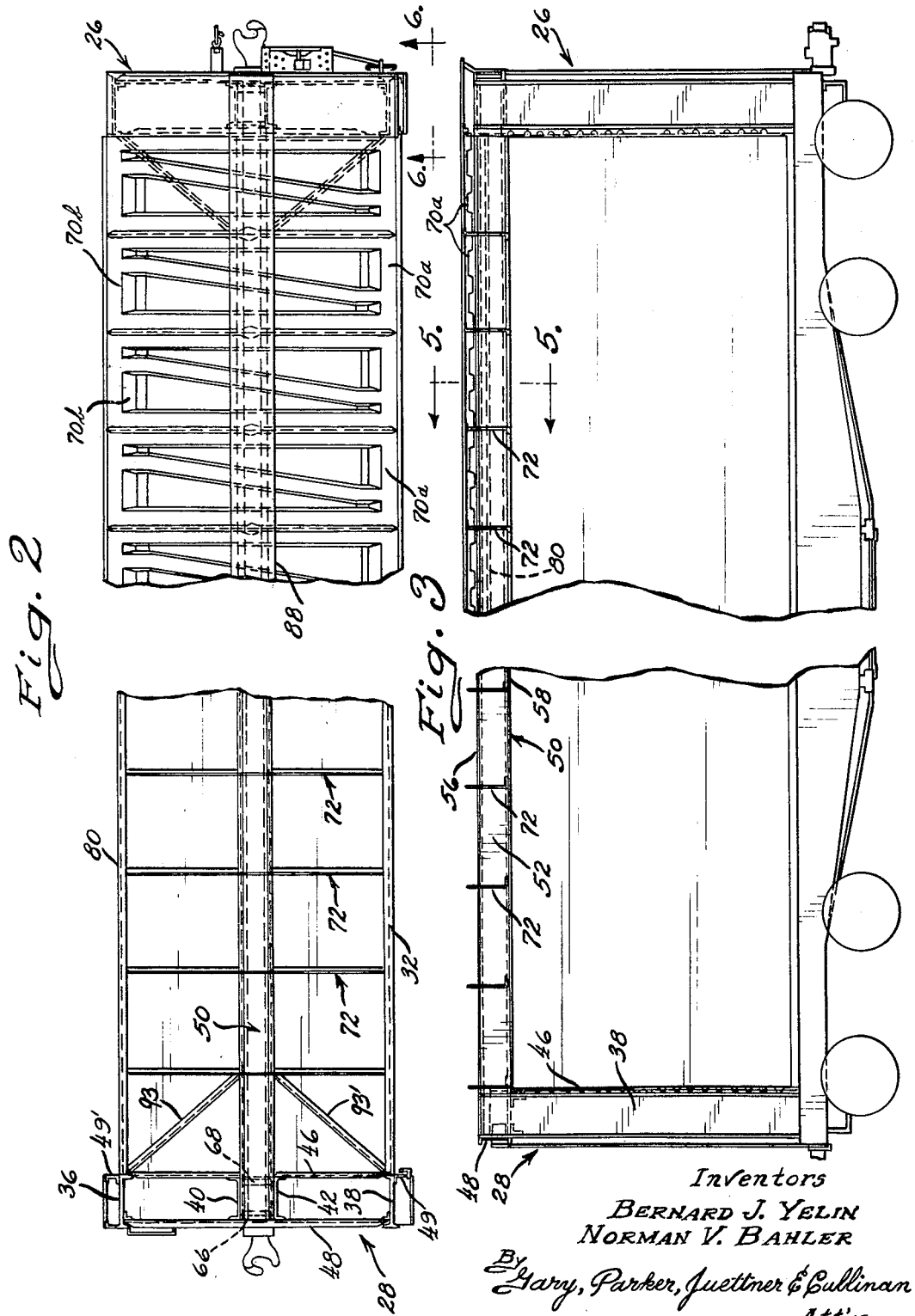

Inventors
BERNARD J. YELIN
NORMAN V. BAHLER
By Gary, Parker, Juettner & Cullinan
Att'ys April 7, 1970  B. J. YELIN ET AL  3,504,638
FREIGHT VEHICLE
Filed June 22, 1966  4 Sheets-Sheet 4
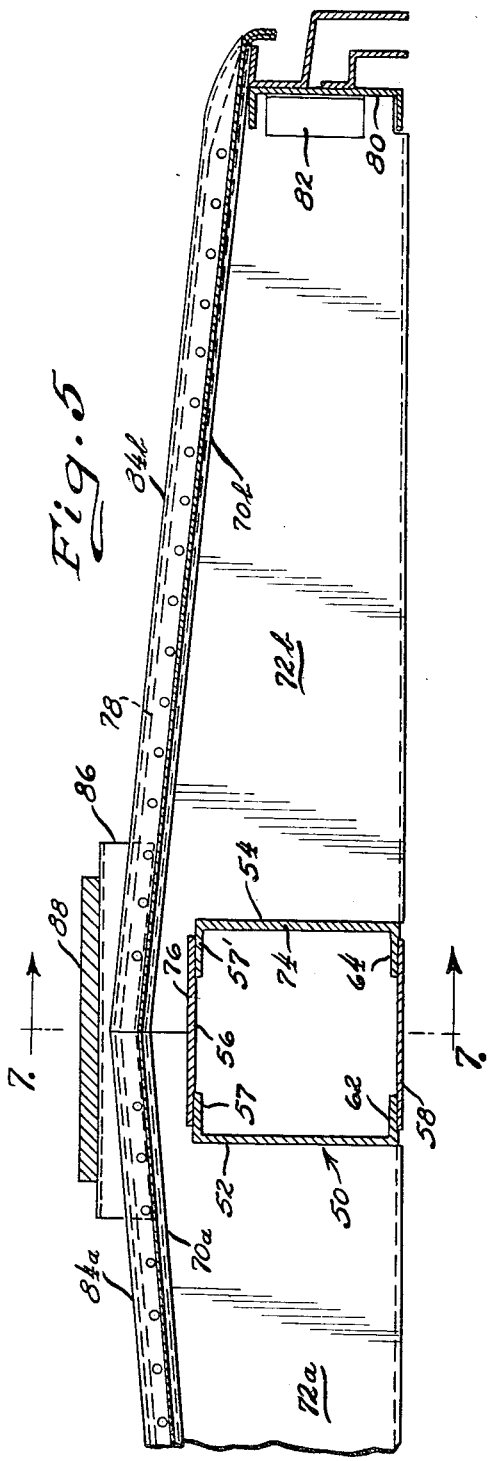
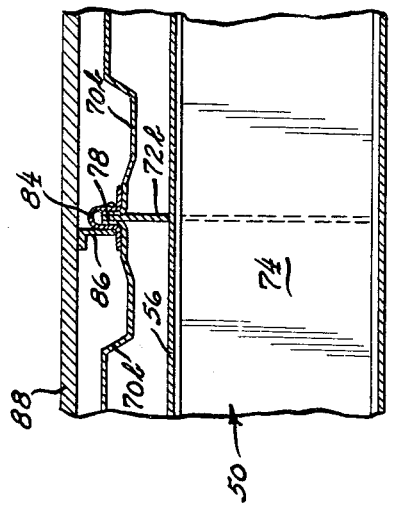
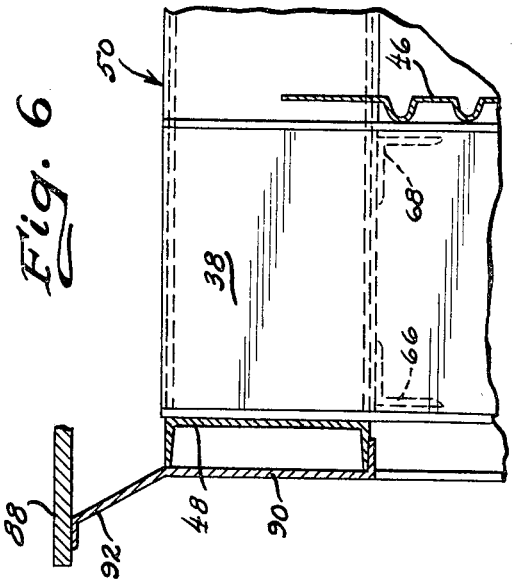
Inventors
BERNARD J. YELIN
NORMAN V. BAHLER
By
Gary, Parker, Juettner & Cullinan
Att'ys

United States Patent Office 3,504,638
Patented Apr. 7, 1970

3,504,638
FREIGHT VEHICLE
Bernard J. Yelin, Buffalo, and Norman V. Bahler, Cheektowaga, N.Y., assignors to Nationwide Railroad Leasing, Inc., Chicago, Ill., a corporation of Illinois
Filed June 22, 1966, Ser. No. 559,492
Int. Cl. B61d *17/08, 17/12, 19/00*
U.S. Cl. 105—404                                                14 Claims

ABSTRACT OF THE DISCLOSURE

The present invention relates to railway freight cars and other freight vehicles of a type where the side walls of the car or vehicle are comprised substantially entirely of movable doors, such doors for example being horizontally slidable on corresponding ones of a plurality of door tracks so as to permit at least one-half of the length of either car side to be opened thereby facilitating the loading and unloading of relatively long lading.

BACKGROUND OF THE INVENTION

A railway freight car having the sides thereof comprised substantially entirely of movable doors offers the substantial advantage that one-half or more of the length of the car side may be opened for loading and unloading, and the portion of the side wall to be thus opened may be varied as desired. For example, if a car side wall is comprised entirely of a plurality of horizontally sliding doors mounted on two parallel door tracks, one-half of the car side may be opened, and if it is desired to permit the opening of more than one-half of the car side wall, three or more door tracks may be provided so that less than half of the doors will slide on any given track. While railway freight cars and other freight vehicles of the foregoing type obviously offer a great advantage in facilitating the loading and unloading of long lading, various problems are presented due to the absence of the conventional stationary side wall members which normally function to assist in supporting the car roof structure. It is therefore necessary to provide other adequate support for the roof in the absence of any support from the side walls of the car from one end thereof to the other.

One solution to the foregoing problem is disclosed in Yelin Patent 3,233,561, issued Feb. 8, 1966, and assigned to the assignee of the present invention. In the latter patent there is disclosed a railway freight car having a pair of vertical columns spaced along the longitudinal center of the car and arranged so as to support the longitudinal expanse of the car roof in the absence of any stationary side wall supporting members. Such vertical columns provide adequate support for the roof intermediate the ends of the car and permit the use of car sides comprised entirely of slidable doors from one end of the car to the other. However, it will be understood that such upright supporting columns in effect divide the car interior into compartments and will in some instances inhibit a desired use of the interior of the car. For example, the columns may prevent loading of long lading into one side of a car and unloading from the opposite side thereof, as is sometimes desirable.

OBJECTS OF THE INVENTION

It is an object of the present invention to provide a railway freight car or freight vehicle having sides comprised substantially entirely of movable doors and having its roof supported without need for any vertical supporting columns or the like intermediate the end bulkheads of the car.

A further object of the invention is to provide a railway freight car or freight vehicle having an improved roof construction including a generally horizontal prestressed roof support beam which extends the full length of the car and permits a clear span from one end of the car to the other.

An additional object is to provide a railway freight car or freight vehicle as above-mentioned including an improved end bulkhead construction for increasing the strength and stability of the car.

Other objects and advantages of the invention will become apparent in the following detailed description.

THE DRAWINGS

FIGURE 1 is a perspective view of a railway freight car constructed in accordance with the teachings of the present invention;

FIGURE 2 is a top plan view, partly broken away, showing the railway freight car of FIGURE 1, a portion of the roof panel structure being removed to illustrate the improved roof support means of the present invention;

FIGURE 3 is a vertical longitudinal sectional view, partly broken away, showing the railway car of FIGURE 1;

FIGURE 5 is a substantially enlarged fragmentary vertical sectional view taken substantially along the line 5—5 of FIGURE 3;

FIGURE 6 is an enlarged fragmentary elevational view, looking approximately in the direction of the arrows 6—6 of FIGURE 2, showing the upper portion of one of the end bulkheads; and FIGURE 7 is a vertical sectional view taken substantially along the line 7—7 of FIGURE 5.

DESCRIPTION OF THE INVENTION

Figure 4:
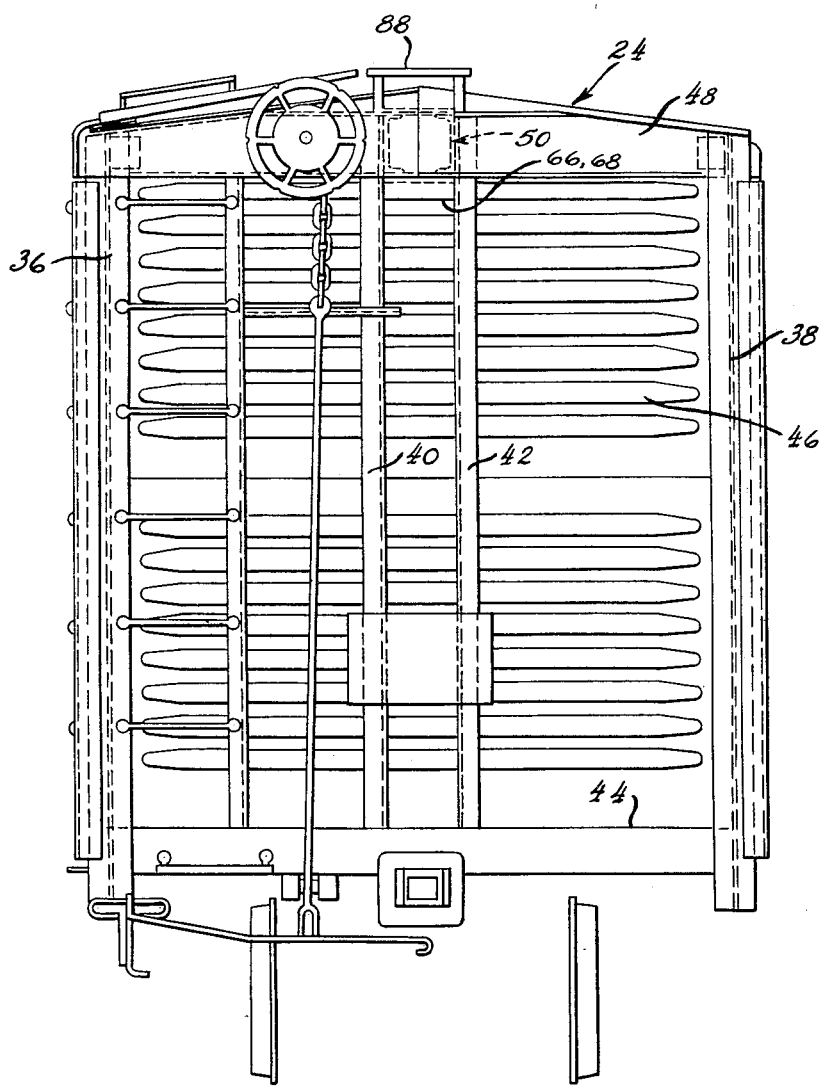
FIGURE 4 is an enlarged end elevational view of the railway car of FIGURE 1.

In order to acquaint those skilled in the art with the manner making and using our improved freight vehicle, we have illustrated in the accompanying drawings and will now describe a preferred embodiment presently contemplated by us as the best mode of carrying out our invention.

Referring now to the drawings, FIGURE 1 shows a railway freight car 20 constructed in accordance with the present invention and comprising a floor or freight deck 22, a roof 24, a pair of end bulkheads 26 and 28, a side sill 30, a side plate 32, and a plurality of horizontally slidable doors 34 which comprise the entire side wall of the car on both sides thereof. By way of example, each side wall of the car may be comprised substantially entirely of six horizontally slidable doors 34 with three of the doors being slidable on an inner door track and the other three being slidable on an outer door track parallel to the inner track, and with such doors constituting the only means for closing the side area of the car between the two end bulkheads. Of course various other door arrangements may be provided within the scope of the present invention. A more complete description of suitable door arrangements will be found in the copending application of Bernard J. Yelin, Ser. No. 515,540 filed Dec. 22, 1965, and assigned to the assignee of the present invention.

Referring now to the end bulkheads 26 and 28 of the car 20, each end includes a pair of vertical I-beams 36 and 38 positioned at the two corners, and a pair of vertical channels 40 and 42 positioned intermediate the corners. The two vertical channels 40 and 42 are arranged proximate the center of the end bulkhead and are positioned in spaced apart relation with their flanges disposed laterally outwardly toward the corner I-beams 36 and 38 respectively. A top end cover plate 44 (see FIGURE 1) is mounted on the top of the underframe end section and serves as a base plate for mounting the entire end structure. A conventional corrugated end wall 46 is positioned immediately inside of the two vertical I-beams 36 and 38 and the two vertical channels 40 and 42 so as to be reinforced by the latter and thereby prevented from bulging outwardly. In addition, a transverse channel member 48 is positioned horizontally with its legs or flanges disposed on the outside, and one end of the channel 48 is welded to the upper end of the corner I-beam 36 while the other end of the channel is welded to the upper end of the opposite corner I-beam 38.

As shown in FIGURE 2, the transverse channel 48 extends across the outer legs of the two vertical channels 40 and 42 at the upper ends of the latter, and the transverse channel 48 may also be welded to the vertical channels so as to provide a rigid interconnection between the upper ends of the vertical I-beams 36 and 38 and the vertical channels 40 and 42. As best shown in FIGURE 4, the upper portion of the transverse channel 48 is altered at the two ends thereof so that the channel conforms with the taper of the two sides of the roof 24. The ends of the channel 48 are also altered as shown in FIGURE 2 so as to fit inside of the flange portions of the I-beams 36 and 38 respectively. The upper ends of the vertical I-beams 36 and 38 are welded to the side plate channels 32 and 80 respectively so that each end of each side plate member is welded to a corresponding one of the vertical I-beams at the corners of the car. Thus, the two side plates 36 and 80 rigidly interconnect the upper portions of the two end bulkheads 26 and 28. The lower ends of the vertical I-beams 36 and 38 and the vertical channels 40 and 42 are welded to the end cover plate 44 which in turn is welded to the underframe end section of the car. FIGURE 2 shows that the outside of one of the legs on the corner I-beam 38 is cut off full length to permit mounting of a door closure angle 49, and the oppositely disposed corner I-beam 36 is similarly modified to permit mounting of a door closure angle 49'. It will thus be understood that the above-described end bulkheads are unusually sturdy and rigid in contrast with a conventional corrugated end wall. In this instance, as described above, a corrugated end panel 46 is provided, but it is disposed inside of and is reinforced by the vertical channels and corner I-beams.

It is another important feature of the present invention that a prestressed horizontal roof support beam 50 extends the full length of the car and serves to support the roof for the full span between the end bulkheads 26 and 28 without need for any vertical columns intermediate the car ends and without need for support from any stationary side wall portions. In the particular embodiment being described, as best shown in FIGURE 5, the horizontal roof support beam 50 is comprised of a pair of longitudinal channels 52 and 54 arranged in parallel spaced apart relation with their leg portions facing one another. A horizontal top plate member 56 is welded to upper legs 57 and 57' of the respective channel members, and a horizontal bottom plate 58 is welded to lower legs 62 and 64 of the channels. Thus, the horizonal room beam 50 comprises a hollow, generally square box section fabricated from two oppositely disposed channels 52 and 54 which constitute the sides of the beam, and the oppositely disposed flat top and bottom plates 56 and 58.

Referring now to FIGURES 2, 3 and 6, the end of the horizontal roof beam 50 extends between the flat sides of the two vertical channels 40 and 42 so that the latter bear against the sides of the roof beam. The extreme end of the roof beam 50 abuts against the flat back side of the transverse channel member 48. The end of the horizontal roof beam 50 may thus be welded to the cross channel 48 and to the vertical channels 40 and 42 so as to rigidly interconnect the end of the roof beam with the end bulkhead 28 of the car. In addition, a pair of angle bars 66 and 68 (best shown in FIGURE 6) extend between the two vertical channels 40 and 42 immediately beneath the end of the horizontal roof beam 50, and the ends of the angles are welded to the vertical channels so as to provide a seat for the roof beam 50 and thereby assist in vertically supporting the end of the latter. It will be understood that the opposite end of the horizontal roof beam 50 is connected with the other end bulkhead 26 of the car 20 in substantially the same manner as described above.

An important feature of the above-described horizontal roof beam 50 is that it is prestressed to provide a predetermined arch or camber. In the embodiment being described, the roof beam 50 is slightly over fifty feet in length, and the beam is prestressed or arched so that as viewed in side elevation the center of the beam is approximately one-half inch higher than the two ends thereof. We have found that the preferred amount of arch or camber for a fifty foot long roof support beam is within the range of one-half inch to one and one-half inches, meaning that the center is one-half to one and one-half inches above the two ends, and the amount of arch or camber is preferably increased or decreased in proportion to the length of the beam. Any desired procedure may be utilized for imparting the foregoing arch or camber to the horizontal roof beam 50. In the particular embodiment described where the roof beam is fabricated from the pair of channels 52 and 54 and the top and bottom plates 56 and 58, the two channels may be supported in such a way as to have a predetermined desired arch, and then the top and bottom plates may be welded in position while the channels are thus supported so as to maintain the arch in the latter. Alternatively, the bottom plate 58 may be heated before it is welded in position, whereby upon cooling it will reduce in length and impart an arch or camber to the roof beam 50. Various other methods may be utilized for imparting the desired arch or camber to the horizontal roof beam 50, and the present invention is in no way limited to any particular method for achieving this structural effect.

The car roof 24 is comprised of a plurality of diagonal roof panels 70 which are mounted on a plurality of transverse ceiling hangers 72. Referring to FIGURE 5, there is shown a left-hand ceiling hanger 72a and a corresponding right-hand ceiling hanger 72b. The ceiling hanger 72b is cutout along its inner end at vertical and horizontal edge portions 74 and 76 so that the hanger fits closely around the side and top of the horizontal roof beam 50, and the hanger is welded to the channel 54 and top plate 56 to provide a rigid connection. An upper edge 78 of the hanger member 72b is tapered downwardly from its inner end to its outer end in accordance with the desired slope of the roof, and the extreme outer end of the hanger 72b is rigidly secured to the side plate channel 80 by an angle bracket 82 which is welded both to the side plate and to the end of the hanger. The corresponding hanger section 72a is mounted and welded in position in the same manner as the hanger section 72b and extends from the left-hand side of the horizontal roof beam 50 to the opposite side plate member 32. As shown in FIGURES 2 and 3, a plurality of transverse ceiling hanger members 72 are arranged parallel to one another in longitudinally spaced relation along the length of the car, each such hanger comprising a pair of left-hand and right-hand hanger sections welded to the roof beam 50 and to a corresponding one of the side plates 32 and 80.

The diagonal roof panels 70 are positioned between the ceiling hangers 72, and as shown in FIGURE 2 a plurality of roof panels 70a are disposed on one side of the car centerline and a plurality of corresponding panels 70b are disposed on the other side thereof. The side edges of adjacent roof panels 70 approximately abut against opposite sides on the ceiling hanger 72 therebetween, as shown for example in FIGURE 7, and a seam cap 84 is riveted or otherwise secured in position over the upper edge of the hanger 72 so as to encompass and hold the adjacent upwardly bent edges of the roof panels. A saddle such as shown at 86 is also secured to each of the seam caps 84 for supporting a running board 88 which extends longitudinally along the top of the car from one end to the other thereof. FIGURE 6 further shows the manner in which an end cover plate 90 is secured to the outside of the transverse channel member 48 at each end of the car, and the cover plate includes an upwardly extending portion 92 which supports the extreme end of the running board 88. In the foregoing manner the entire roof 24 of the car 20 is formed by the several left-hand and right hand roof panels 70a and 70b. FIGURE 5 illustrates a left-hand seam cap 84a which is riveted at several places along its length to a corresponding left-hand hanger 72a and a pair of adjacent roof panels 70a, and a right-hand seam cap 84b which is similarly riveted at several places along its length to a corresponding right-hand hanger 72b and to a pair of adjacent roof panels 70b.

It will be understood from the foregoing description that the roof panels 70 are supported on the ceiling hangers 72, and the latter are supported at their outer ends by the side plates 32 and 80 and at their inner ends by the prestressed horizontal roof support beam 50. Because of the arch or camber imparted to the roof support beam 50, the downward load thereon produced by the weight of the roof tends to reduce the camber and force the two ends of the support beam longitudinally outwardly. However, because each end of the support beam 50 abuts against a transverse channel such as shown at 48 in FIGURES 2 and 6, and because the channel 48 is anchored to the two vertical channels 40 and 42 and the two corner posts or I-beams 36 and 38, the entire reinforced end bulkhead of the car resists any longitudinal extension of the roof support beam 50 and thereby prevents the latter from being deflected from its arched configuration. In this respect it is important to note that as vertical loads on the roof beam 50 tend to cause the latter to sag and reduce the arch or camber thereof, the two ends of the roof beam will push outwardly on the two end bulkheads 26 and 28 of the car. Such end bulkheads however are rigidly interconnected at their upper ends by the two longitudinal side plates 32 and 80 which will thus be subjected to tension while the roof support beam 50 is subjected to compression. Such an arrangement ties the various components together for cooperation with one another and provides an extremely rigid roof construction which effectively prevents sagging of the roof in the absence of side wall supporting members and in the absence of any supporting columns intermediate the end bulkheads. It will further be noted, as shown in FIGURE 2, that a pair of diagonal braces 93 and 93' are provided each having one end welded to a side of the roof support beam 50 and its other end welded to a corresponding one of the corner I-beams 36 and 38 so as to further brace the roof beam against the end bulkhead structure and thereby prevent longitudinal movement of the roof beam.

We have found that by means of the foregoing structural arrangement it is possible to support the roof 24 vertically and prevent any appreciable longitudinal movement thereof without the necessity for any vertical support columns of the type described in the previously mentioned U.S. Patent 3,233,561 and without any stationary side wall portions to assist in the support of the roof. Accordingly, the present invention makes it possible to construct a railway freight car or freight vehicle of a type where both sides are comprised substantially entirely of movable doors and where the interior of the car provides a clear span from one end of the car to the other uninterrupted by any vertical columns or the like. Moreover, it is an important advantage of the present invention that the foregoing design is accomplished by structural arrangements which do not significantly increase the weight of the car. In the railroad industry there are limitations as to the total weight on rail for a given size and type of freight car. For example, a so-called seventy ton car is subject to a permissible weight on the rail of 220,000 pounds. Therefore, by minimizing the weight of the car itself, the lading carrying capacity of the car is increased proportionately. The principal added components for supporting the car roof in accordance with the present invention are of course the horizontal roof support beam 50, and the two vertical channels 40 and 42 and two vertical corner posts or I-beams 36 and 38 at the two ends of the car. While these components are quite sturdy, they constitute a relatively simplified and lightweight structure for accomplishing the objective of providing an all-door car without vertical supporting columns intermediate the end bulkheads of the car.

Referring to the particular embodiment of the horizontal roof support beam 50 as described hereinabove, and as best shown in FIGURE 5, the top and bottom plates 56 and 58 each comprises a steel plate which is ⅜ inch in thickness, eleven inches wide, and slightly over fifty-one feet in length. The two channels 52 and 54 each comprises a twelve inch channel weighing 20.7 pounds/foot. As previously described, the resultant roof beam 50 constitutes a hollow generally square box section, and the beam is prestressed so as to have an arch or camber with the central portion one-half to one and one-half inches higher than the ends, the latter range being for the particular beam here described which is slightly over fifty feet in length. However, it should be understood that various types of prestressed horizontal roof support beams may be utilized in conjunction with the present invention other than the generally square box section described. Thus, a tubular or hollow round member may be utilized, one example of the latter being a twelve inch pipe weighing 65 pounds/lineal foot. Such a tubular hollow round horizontal roof beam should also be prestressed so as to have an arch or camber in the range previously described whereby vertical loads on the beam will tend to create longitudinally outward forces on the beam ends, which forces are resisted by the unusually strong and rigidly interconnected end bulkheads with which the car of the present invention is equipped.

The prestressed horizontal support beam 50 and cooperating reinforced end bulkheads 26 and 28 of the present invention are extremely effective in supporting the car roof vertically and in preventing any horizontal movement thereof, without vertical supporting columns intermediate the ends of the car and without stationary side wall portions to assist in providing such support. The roof is prevented from any appreciable amount of sagging so that the doors 34 may be lifted on the usual door rollers and slid horizontally along their respective door tracks without any interference such as would otherwise occur if sagging of the roof or side plate structure were not prevented. The roof beam 50 is itself prevented from sagging and its predetermined arch or camber maintained by the relatively strong end bulkheads which are rigidly interconnected by the side plate channels 32 and 80 and which resist outward movement and thereby resist any longitudinal extension of the arched roof beam 50. The plurality of longitudinally spaced ceiling hangers 72 are welded to the horizontal roof beam 50 and to the two side plate channels 32 and 80 so as to prevent lateral movement of the roof structure. The particular railway car described herein has a length of approximately fifty feet, although of course the invention is applicable to freight cars or vehicles of various other lengths. Having in mind that in this instance a fifty foot span of roof is supported vertically and prevented from horizontal movement without intermediate supports between the end bulkheads, the structure described for accomplishing such a result is unusually light in weight and therefore permits the car to have a large lading carrying capacity.

While we have described our invention in certain preferred forms, we do not intend to be limited to such

We claim:

1. In a freight vehicle, the improvement comprising, in combination, a pair of reinforced end bulkheads, one at each end of the freight vehicle, a pair of side plate members interconnecting the upper portions of said end bulkheads at the respective sides of said vehicle, a prestressed horizontal roof support beam extending the full length of said vehicle from one of said end bulkheads to the other and braced against said end bulkheads adjacent the upper ends of the latter, and a vehicle roof mounted so as to be supported on said horizontal roof beam, said roof beam being arched so that the central portion is higher than the two ends thereof whereby vertical loads on said roof beam will load the roof beam in compression and the ends of the latter will be supported by said interconnected reinforced end bulkheads so as to prevent any substantial sagging of said arched roof beam.

2. The invention of claim 1 where a plurality of ceiling hanger members are supported on said horizontal roof support beam, and a plurality of roof panel members are mounted on said ceiling hangers and supported thereby.

3. The invention of claim 1 where said prestressed horizontal roof support beam is generally parallel to said pair of side plate members and extends along a longitudinal centerline of said freight vehicle approximately midway between said side plate members.

4. The invention of claim 1 where for an arched roof support beam of approximately fifty feet in length its central portion is approximately one-half inch to one and one-half inches higher than the ends thereof, and the amount of such arch is varied in direct proportion to said length.

5. The invention of claim 2 wherein said ceiling hangers extend transversely and are longitudinally spaced along the length of the vehicle, each of said ceiling hangers being supported at its inner end by said horizontal roof support beam and at its outer end by a corresponding one of said side plates.

6. In a freight vehicle, the improvement comprising, in combination, a pair of reinforced end bulkheads, one at each end of the freight vehicle, a pair of side plate members interconnecting the upper portions of said end bulkheads at the respective sides of said vehicle, a prestressed horizontal roof support beam extending the full length of said vehicle from one of said end bulkheads to the other and braced against said end bulkheads adjacent the upper ends of the latter, said roof support beam being generally parallel to said pair of side plate members and extending along a longitudinal centerline of said freight vehicle approximately midway between said side plate members, a plurality of transverse ceiling hanger members longitudinally spaced along the length of the vehicle, each of said ceiling hangers being supported at its inner end by said horizontal roof support beam and at its outer end by a corresponding one of said side plates, and a plurality of roof panel members mounted on said ceiling hangers and supported thereby, said roof beam being arched so that its central portion is higher than the two ends thereof whereby vertical loads on said roof beam will load the roof beam in compression and the ends of the latter will be supported by said interconnected reinforced end bulkheads so as to prevent any substantial sagging of said arched roof beam, said central portion being approximately one-half inch to one and one-half inches higher than said ends thereof for a roof support beam of approximately fifty feet in length and the amount of said arch being varied in direct proportion to said length.

7. In a freight vehicle, the improvement comprising, in combination, a pair of reinforced end bulkheads one at each end of the freight vehicle, a pair of side plate members interconnecting the upper portions of said end bulkheads at the respective sides of the vehicle, a horizontal roof support beam extending the full length of said vehicle from one of said end bulkheads to the other and connected with said end bulkheads adjacent the upper ends of the latter, said roof support beam comprising a fabricated hollow box section which is generally rectangular in transverse section, and a vehicle roof mounted so as to be supported on said horizontal roof beam.

8. The invention of claim 7 where said roof beam is arched so that its central portion is higher than the two ends thereof whereby vertical loads on said roof beam will load the roof beam in compression and the ends of the latter will be supported by said interconnected reinforced end bulkheads so as to prevent any substantial sagging of said arched roof beam.

9. The invention of claim 8 where said central portion of said roof support beam is approximately one-half inch to one and one-half inches higher than the ends thereof for a roof support beam of approximately fifty feet in length, the amount of said arch being varied in direct proportion to said length.

10. The invention of claim 8 where said arched roof beam is generally parallel to said pair of side plate members and extends along a longitudinal centerline of said freight vehicle approximately midway between said side plate members, and a plurality of tranverse ceiling hanger members longitudinally spaced along the length of the vehicle, each of said ceiling hangers being supported at its inner end by said horizontal roof support beam and at its outer end by a corresponding one of said side plates, said vehicle roof including a plurality of roof panel members mounted on said ceiling hangers and supported thereby.

11. In a freight vehicle, the improvement comprising, in combination, a pair of reinforced end bulkheads, one at each end of the freight vehicle, a pair of side plate members interconnecting the upper portions of said end bulkheads at the respective sides of said vehicle, a prestressed horizontal roof support beam extending the full length of said vehicle from one of said end bulkheads to the other and braced against said end bulkheads adjacent the upper ends of the latter, said roof support beam being generally parallel to said pair of side plate members and extending along a longitudinal centerline of said freight vehicle approximately midway between said side plate members, and a vehicle roof mounted so as to be supported on said horizontal roof beam, said roof beam being arched so that the central portion is higher than the two ends thereof whereby vertical loads on said roof beam will load the roof beam in compression and the ends of the latter will be supported by said interconnected reinforced end bulkheads so as to prevent any substantial sagging of said arched roof beam, each of said end bulkheads including a first pair of vertical corner support beams connected at their upper ends to the ends of corresponding ones of said side plate members, and a second pair of vertical support beams intermediate said corner beams and on opposite sides of the corresponding end of said horizontal roof beam in close proximity thereto, said second pair of vertical support beams being connected at their upper ends to said end of said horizontal roof beam.

12. The invention of claim 11 wherein each of said end bulkheads includes a transverse beam having one end connected to the upper end of one of said vertical corner beams and its other end connected to the upper end of the other of said vertical corner beams, said transverse beam being positioned to brace the corresponding end of said horizontal roof support beam so that loads on the latter will be transmitted by said transverse beam to said first pair of vertical corner support beams.

13. The invention of claim 12 where said transverse beam is mounted at the outside of said first and second pairs of vertical support beams and where the corresponding end of said horizontal roof support beam abuts directly against the center of said transverse beam.

14. The invention of claim 11 where each of said end bulkheads includes a corrugated end panel positioned vertically at the inside of said first and second pairs of vertical support beams.

References Cited

UNITED STATES PATENTS

| | | | |
|---|---|---|---|
| 1,208,097 | 12/1916 | Collins et al. | 135—26 |
| 1,400,140 | 12/1921 | Callery | 105—378 |
| 2,033,689 | 3/1936 | Dawson | 52—73 |
| 2,128,539 | 7/1956 | Warjein | 105—378 |
| 2,930,332 | 3/1960 | Cook et al. | 105—378 |
| 2,996,020 | 8/1961 | Udstad | 105—367 |
| 3,233,561 | 2/1966 | Yelin | 105—355 |

ARTHUR L. LA POINT, Primary Examiner

RICHARD A. BERTSCH, Assistant Examiner

U.S. Cl. X.R.

105—355, 378